United States Patent
Little (10) Patent No.: US 8,363,351 B1
(45) Date of Patent: Jan. 29, 2013

(54) DISK DRIVE BASE HAVING A RAISED THERMAL PEDESTAL

(75) Inventor: Aaron D. Little, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 979 days.

(21) Appl. No.: 12/181,469

(22) Filed: Jul. 29, 2008

(51) Int. Cl.
*G11B 33/08* (2006.01)

(52) U.S. Cl. .................................... 360/97.19

(58) Field of Classification Search .............. 360/97.01, 360/97.19
See application file for complete search history.

(56) References Cited

U.S. PATENT DOCUMENTS

| | | | | |
|---|---|---|---|---|
| 5,262,922 A | * | 11/1993 | Yamaji et al. | 361/720 |
| 5,379,185 A | * | 1/1995 | Griffin et al. | 361/709 |
| 5,424,913 A | * | 6/1995 | Swindler | 361/679.54 |
| 5,777,844 A | | 7/1998 | Kiefer | |
| 5,969,940 A | * | 10/1999 | Sano et al. | 361/679.52 |
| 6,101,095 A | * | 8/2000 | Yamaguchi | 361/720 |
| 6,603,659 B2 | | 8/2003 | Kim et al. | |
| 6,762,907 B2 | | 7/2004 | Patel et al. | |
| 6,831,833 B2 | | 12/2004 | Kim et al. | |
| 2007/0153414 A1 | | 7/2007 | Sullivan et al. | |

OTHER PUBLICATIONS

Sil-Pad 900S Data Sheet, downloaded from www.bergquistcompany.com on Jul. 25, 2008 (http://bergquistcompany.com/objects/data_sheets/PDS_SP_900S_0307E.pdf), 1 page.

* cited by examiner

*Primary Examiner* — David D Davis (57) ABSTRACT

A disk drive includes a printed circuit board, an integrated circuit coupled to the printed circuit board, and a disk drive base coupled to the printed circuit board. The disk drive base includes a platform, the platform having a first surface elevated towards the printed circuit board and a second surface further elevated towards the printed circuit board relative to the first surface, the platform being generally aligned with the integrated circuit along an axis normal to the first surface.

16 Claims, 10 Drawing Sheets

DISK DRIVE BASE HAVING A RAISED THERMAL PEDESTAL

BACKGROUND

The integrated circuits that control various operations performed by disk drives typically generate a great deal of heat. Moreover, as disk drive performance has improved, these integrated circuits have been clocked faster and faster, causing them to generate even more heat. If this heat cannot be properly dissipated from the integrated circuits, they can overheat and cause operational errors.

Conventionally, disk drive integrated circuits are located on a printed circuit board facing a disk drive base. Portions of the disk drive base may be raised towards one or more of the integrated circuits, and, thus, the relatively large metallic disk drive base may serve as a heat sink for the heat generated by the integrated circuits during operation.

In order for the disk drive base to serve as an effective heat sink, the integrated circuits and the disk drive base should be positioned in close proximity. However, if the disk drive base applies excessive pressure to an integrated circuit, the printed circuit board carrying the integrated circuit may be undesirably bowed outwards from the disk drive base. Thus, the effectiveness of the heat sink must be balanced against the amount of pressure that can be applied to the printed circuit board, and this balance must be maintained over a range of manufacturing tolerances.

There is therefore a need for improved structures for cooling disk drive integrated circuits.

DETAILED DESCRIPTION

Figure 1:
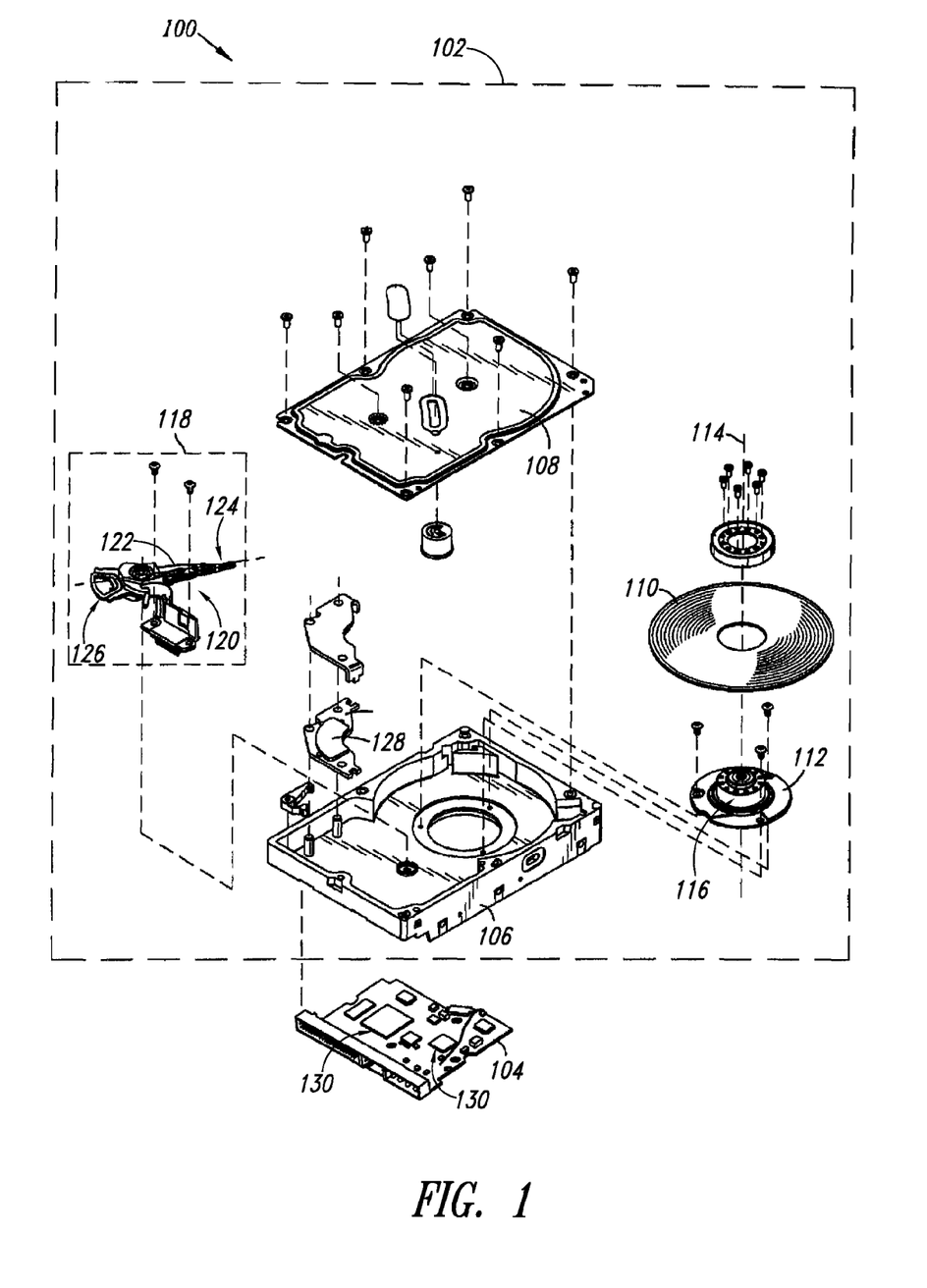
FIG. 1 is an exploded, perspective view generally illustrating a disk drive that may incorporate an embodiment.

Referring to FIG. 1, a disk drive 100 is illustrated, which may incorporate one or more embodiments. As illustrated, the disk drive 100 comprises a magnetic disk drive, and the structures and methods described herein will be described in terms of such a disk drive. However, the structures and methods described herein may also be applied to and/or implemented in other disk drives, including, e.g., optical and magneto-optical disk drives.

The disk drive 100 comprises a head disk assembly ("HDA") 102 and a printed circuit board ("PCB") 104. The HDA 102 includes a disk drive base 106 and a cover 108, which together house a number of disk drive components. The disk drive base 106 may comprise a monolithic structure to which other disk drive components are coupled. In one embodiment, the disk drive base 106 comprises a cast piece of aluminum. However, in other embodiments, different materials and methods of shaping such materials may, of course, be used.

The disk drive 100 further includes a disk 110, which may comprise any of a variety of magnetic or optical disk media. In one embodiment, the disk 110 comprises a plurality of generally concentric tracks for storing data. In different embodiments, more disks 110 may be included in the disk drive 100.

As illustrated, a motor 112 is coupled to and configured to rotate the disk 110 about a disk axis of rotation 114. The motor 112 may include a motor hub 116 that is rotatably attached to the disk drive base 106.

The HDA 102 further includes a head stack assembly ("HSA") 118 rotatably attached to the disk drive base 106. The HSA 118 may include an actuator 120 having one or more actuator arms 122. A head gimbal assembly ("HGA") 124 may be attached to a distal end of each actuator arm 122. Each HGA 124 includes a head for reading data from and writing data to the disk 110. The HSA 118 may further include a coil 126 through which a changing electrical current is passed. The coil 126 interacts with one or more magnets 128 to form a voice coil motor ("VCM") for controllably rotating the HSA 118.

The PCB 104 may comprise any of a variety of circuit boards to which integrated circuits 130 may be coupled. The integrated circuits 130 may embody different logical subsystems used to control disk drive operations. In one embodiment, the integrated circuits 130 may include, inter alia, servo circuitry, a read channel, a disk interface and a controller. The above subsystems may be incorporated into a single system on a chip ("SoC"). Thus, a single piece of silicon may incorporate all of the above functionality. In other embodiments, these subsystems may be implemented as separate circuit elements on the PCB 104. There may also be additional integrated circuits 130 coupled to the PCB 104, such as power driver circuitry for motors driven by the PCB 104, random access memory, flash memory, etc.

Figure 2:
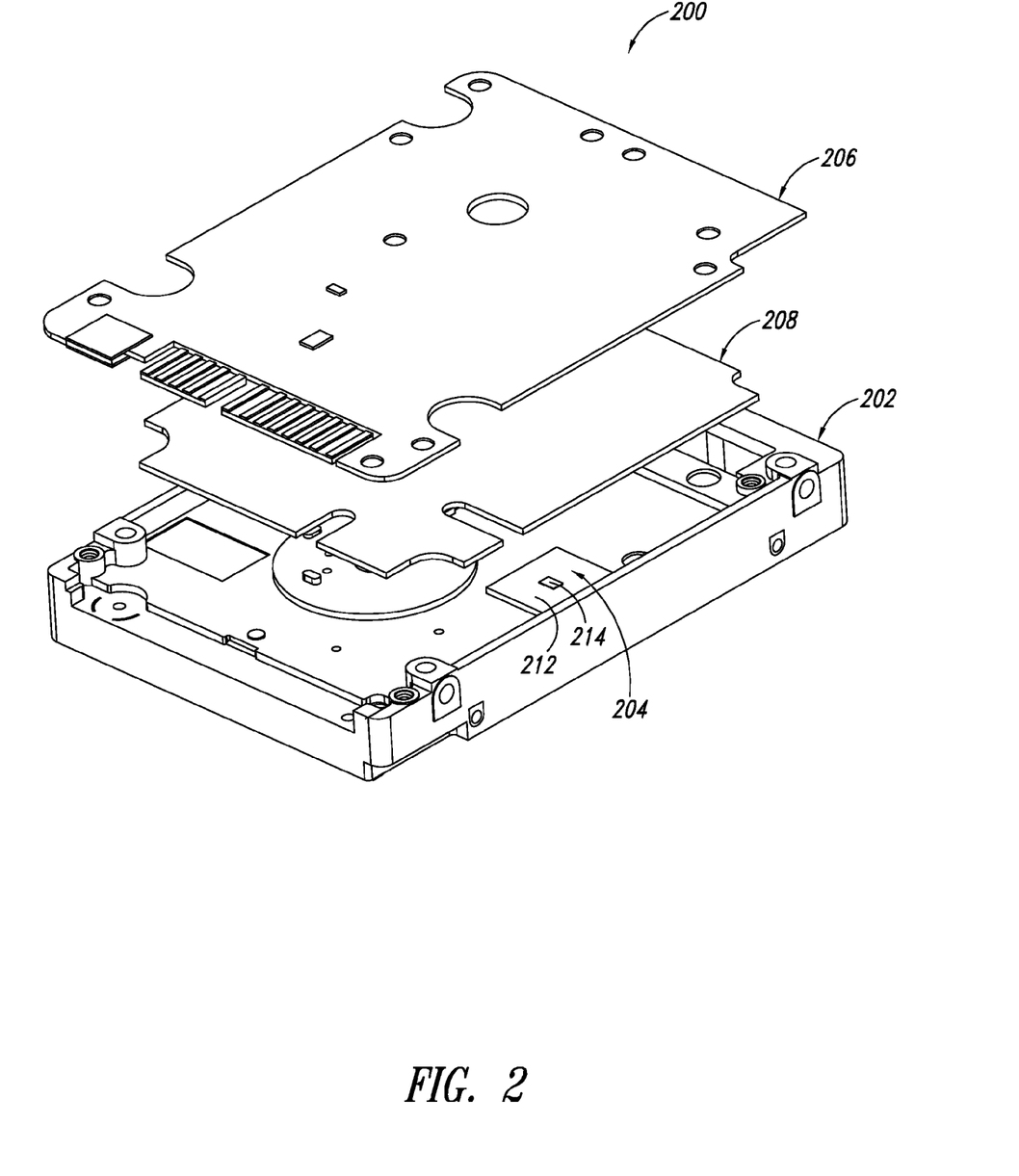
FIG. 2 is an exploded, bottom perspective view illustrating a disk drive including an exemplary disk drive base, a printed circuit board and an interposed layer of material, according to one illustrated embodiment.
Figure 3:
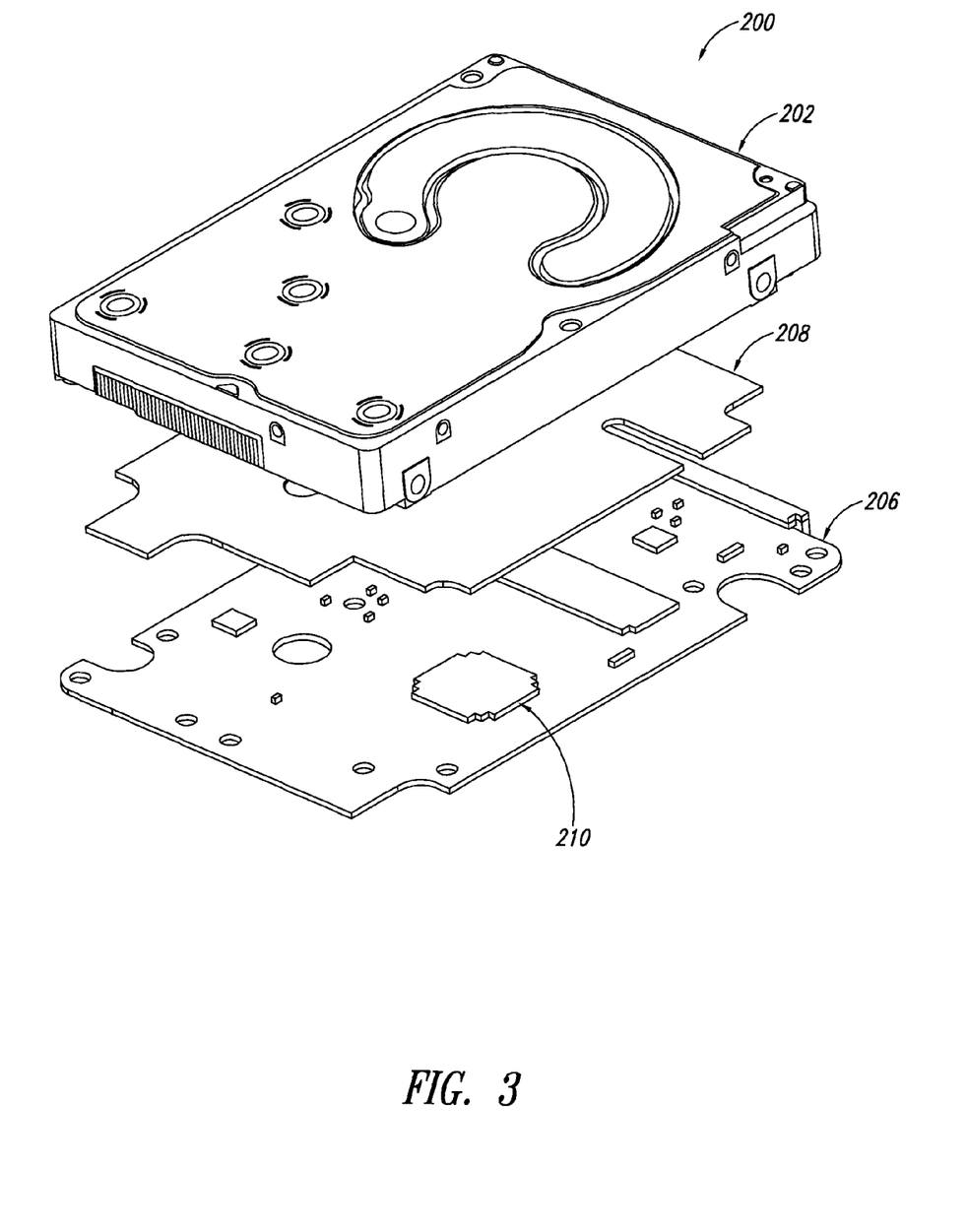
FIG. 3 is an exploded, top perspective view of the disk drive of FIG. 2, according to one illustrated embodiment.
Figure 4:
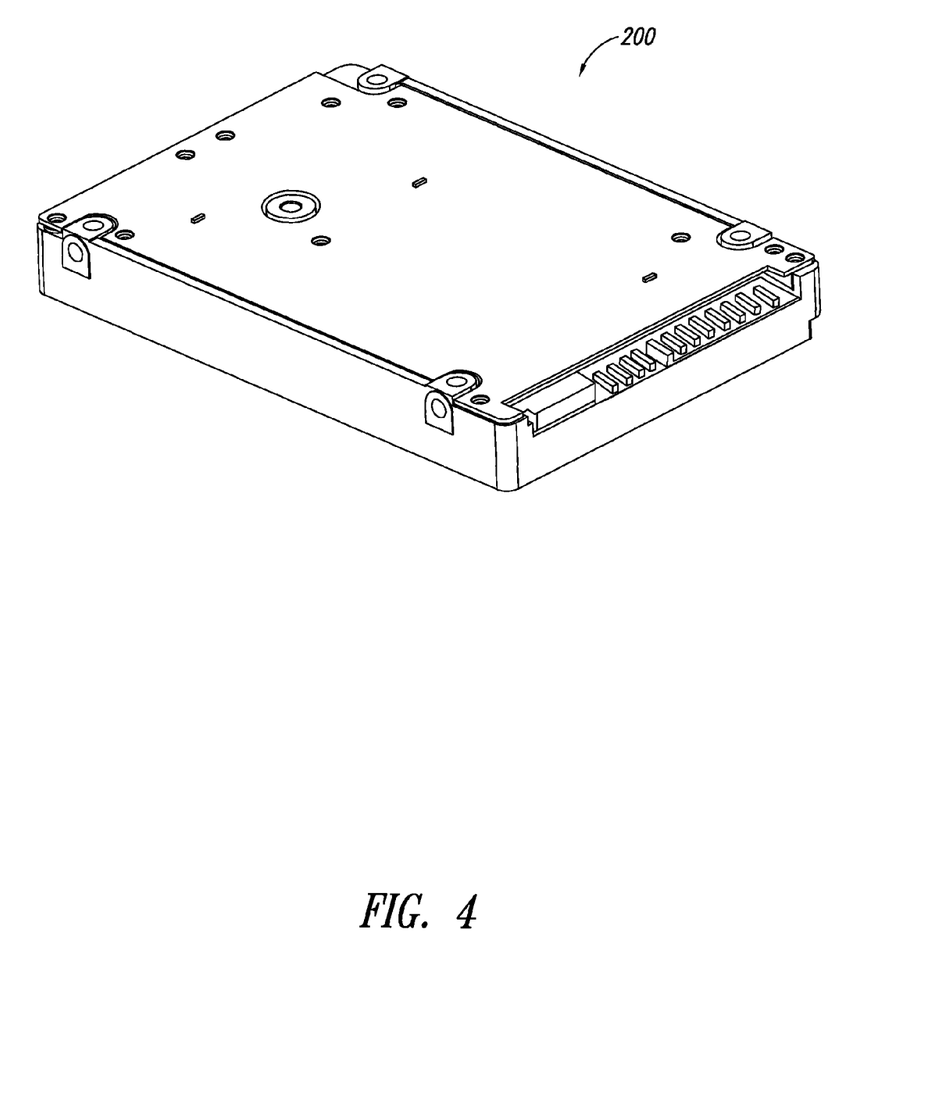
FIG. 4 is a bottom perspective view of the disk drive of FIG. 2, according to one illustrated embodiment.

FIGS. 2 and 3 show bottom and top perspective views of another exemplary disk drive 200 including a disk drive base 202 having a platform 204, a printed circuit board 206 and an interposed layer of material 208, according to one illustrated embodiment. These Figures illustrate exploded views of the disk drive 200, while FIG. 4 illustrates the disk drive 200 in its final configuration.

As illustrated, the disk drive 200 comprises a printed circuit board ("PCB") 206, and an integrated circuit 210 coupled to the PCB 206. The disk drive 200 further includes a disk drive base 202 coupled to the PCB 206. The disk drive base 202 may include a platform 204, the platform 204 having a first surface 212 elevated towards the PCB 206 and a second surface 214 further elevated towards the PCB 206 relative to the first surface 212, the platform 204 being generally aligned with the integrated circuit 210 along an axis normal to the first surface 210.

As described above with reference to the PCB 104, the PCB 206 may comprise any of a variety of printed circuit boards. In one embodiment, the PCB 206 comprises a non-conductive substrate carrying a plurality of integrated circuits electrically connected to one another by conductive traces.

The integrated circuit 210 may comprise any of the plurality of integrated circuits coupled to the PCB 206. In one embodiment, the integrated circuit 210 comprises an SoC, which may include, inter alia, servo circuitry, a read channel, a disk interface, and a controller. In another embodiment, the integrated circuit 210 may comprise power driver circuitry configured to drive a spindle motor and/or a voice coil motor.

The integrated circuit 210 may be coupled to the PCB 206 by any of a number of techniques. In one embodiment, one or more leads of the integrated circuit 210 are soldered to the PCB 206. In other embodiments, the integrated circuit 210 may be formed integrally with the PCB 206.

In different disk drive applications, the disk drive base 202 may have different geometries and may be manufactured from different materials. In one embodiment, the disk drive base 202 comprises a cast or machined piece of aluminum. In other embodiments, different materials and methods of manufacturing may be used.

The disk drive base 202 may be coupled to the PCB 206 by one or more screws arranged along a perimeter of the PCB 206. In other embodiments, different structures and manufacturing techniques for coupling the disk drive base 202 to the PCB 206 may be used, including techniques for developing a vacuum-tight seal between these components.

As illustrated in FIG. 2, the disk drive base 202 includes the platform 204 elevated towards the PCB 206. In one embodiment, this platform 204 is generally aligned with the integrated circuit 210 and may facilitate heat dissipation from the integrated circuit 210. In some embodiments, the platform 204 may be formed from a material with relatively good thermal conductivity. For example, the platform 204 may be formed from the disk drive base 202 and may comprise aluminum. In other embodiments, other metals or other materials may be used to form the platform 204.

The platform 204 may be formed on the disk drive base 202 in a variety of ways. In one embodiment, the platform 204 and the disk drive base 202 are monolithic. For example, the platform 204 may be formed during a casting operation of the disk drive base 202. As another example, the platform 204 may be formed by a machining operation performed on the disk drive base 202. In other embodiments, the platform 204 and the disk drive base 202 may be separate components that are coupled together during a manufacturing process.

The platform 204 defines a first elevated surface 212, which may have any of a variety of different geometries. In one embodiment, the first surface 212 has a shape generally corresponding to a shape of the integrated circuit 210 facing the first surface 212. For example, the first surface 212 may have a rectangular surface area that is sized and shaped to mirror a rectangular surface area of the integrated circuit 210. Of course, the first surface 212 and the integrated circuit 210 need not define identical or geometrically similar surface areas. In some embodiments, the first surface 212 may have a much larger or smaller surface area than that of the integrated circuit 210. In other embodiments, the first surface 212 may define any of a variety of shapes which may or may not be geometrically similar to the shape of the integrated circuit 210.

In one embodiment, the first surface 212 is generally parallel with a plane defined by the disk drive base 202. In other embodiments, however, the first surface 212 may define a slope, or may have more complex surface contours.

The platform 204 also defines a second surface 214 further elevated relative to the first surface 212. The second surface 214 may be generally aligned, along an axis normal to the second surface 214, with a portion of the integrated circuit 210 (hereinafter, "the high temperature portion") that has a high operational temperature relative to other portions of the integrated circuit 210. Of course, in other embodiments, the second surface 214 may be defined at other positions on the platform 204.

The second surface 214 may have any of a variety of geometries. In one embodiment, the second surface 214 defines a shape generally corresponding to this high temperature portion of the integrated circuit 210. For example, the second surface 214 may have a rectangular surface area generally conforming to the high temperature portion. In other embodiments, the second surface 214 may take on other shapes that are more or less similar to the shape of the high temperature portion.

As illustrated, the second surface 214 may be generally parallel with a plane defined by the disk drive base 202. In other embodiments, however, the second surface 214 may define a slope, or may have more complex surface contours.

Although the platform 204 is illustrated with only one continuous second surface 214, in other embodiments, the platform 204 may have a plurality of separate surfaces elevated relative to the first surface 212. The elevations/heights of these distinct surfaces may be the same or may vary. In some embodiments, such elevated surfaces may correspond to a plurality of high temperature portions of the integrated circuit 210.

In one embodiment, as illustrated in FIGS. 2 and 3, the disk drive 200 may further comprise a layer of material 208 interposed between the PCB 206 and the platform 204. This layer of material 208 may be operable to transfer heat from the integrated circuit 210 through the layer of material 208 to the platform 204 by conduction. In some embodiments, the layer of material 208 directly contacts both the PCB 206 (including the integrated circuit 210) and the platform 204. However, the disk drive 200 may also include other layers and structures that prevent such direct contact.

The layer of material 208 may comprise any of a variety of materials. In one embodiment, the layer of material 208 is compressible. In other embodiments, the layer of material 208 may be relatively incompressible. In one embodiment, the layer of material 208 may be formed from a material with relatively high thermal conductivity in order to facilitate cooling of the integrated circuit 210. In other embodiments, the layer of material 208 may be relatively insulative. Although referred to in the singular, the layer of material 208 may itself comprise a number of layers of different materials. For example, the layer of material 208 may comprise an acoustic gasket material. In one embodiment, this acoustic gasket material may have two layers of plastic surrounding air. In other embodiments, the layer of material 208 may comprise a variety of different layers of materials.

The layer of material 208 may also be larger or smaller in different embodiments. In one embodiment, the layer of material 208 may be positioned over a whole or only a portion of the platform 204, and may not extend beyond the platform 204. For example, the layer of material 208 may cover substantially an entire surface area of the second surface 214 of the platform 204. In another embodiment, the layer of material 208 may cover substantially an entire surface area of the PCB 206 including the second surface 214 of the platform 204, as illustrated in FIGS. 2 and 3.

Figure 5:
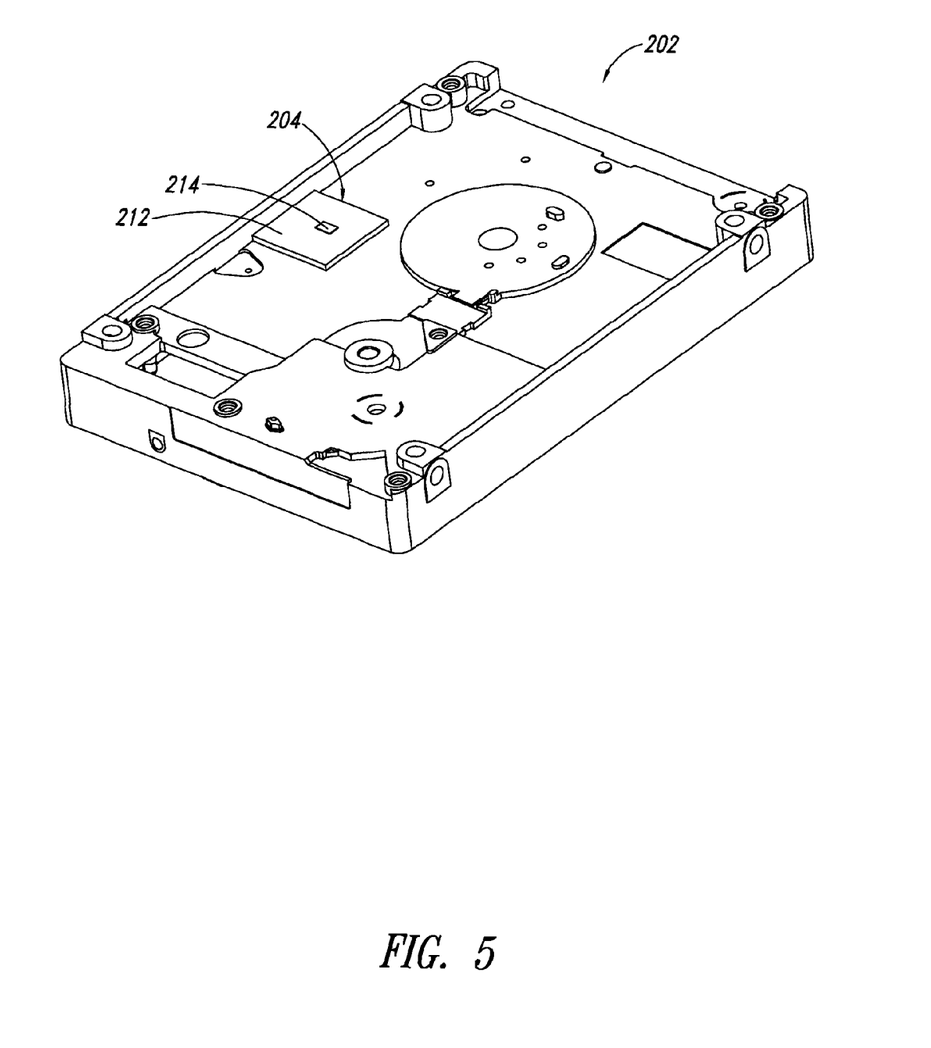
FIG. 5 is a bottom perspective view illustrating the disk drive base of FIG. 2, according to one illustrated embodiment.
Figure 6A:
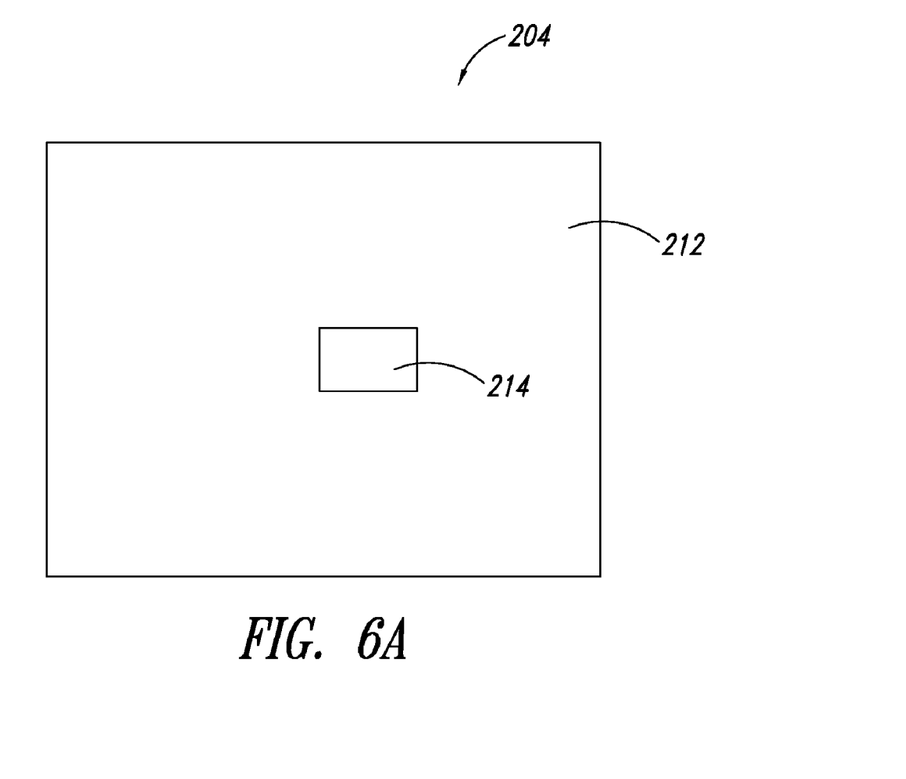
FIG. 6A is a top, schematic view of a platform on the disk drive base of FIG. 2, according to one illustrated embodiment.
Figure 6B:
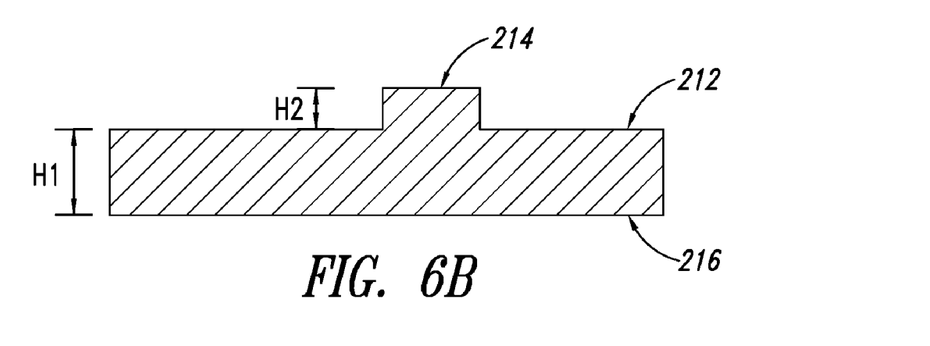
FIG. 6B is a cross-sectional, side view of the platform of FIG. 6A, according to one illustrated embodiment.

FIG. 5 is a bottom perspective view illustrating the disk drive base 202 and the platform 204, without the PCB 206 and the layer of material 208. FIGS. 6A and 6B show top and cross-sectional, side views, respectively, of the platform 204. These Figures illustrate in greater detail the geometry of the platform 204.

In one embodiment, the first surface 212 is elevated above a base 216 of the platform 204 by a first height, illustrated as H1 in FIG. 6B. The second surface 214 may, in turn, be further elevated above the first surface 212 by a second height, illustrated as H2 in FIG. 6B. In one embodiment, the second height H2 of the second surface 214 may be a relatively small percentage of the first height H1. Moreover, the second height H2 of the second surface 214 may also comprise a relatively small percentage of the thickness of the layer of material 208 in an uncompressed state. For example, in one embodiment, the second height H2 of the second surface 214 may be between 1% and 25% of a thickness of the layer of material 208 in an uncompressed state. With this relatively small height increase, the PCB 206 may be less likely to bow significantly due to the increased pressure from the elevated second surface 214.

As may be seen from FIGS. 5 and 6A, the second surface 214 may define a surface area that comprises a relatively small percentage of the surface area of the first surface 212. For example, the second surface 214 may define a surface area that comprises less than or equal to 20% of the surface area of the first surface 212. In one embodiment, this relatively small surface area of the second surface 214 may enable the second surface 214 to be brought closer to the integrated circuit 210 with relatively little bowing of the PCB 206. Of course, in other embodiments, the second surface 214 may define larger surface areas relative to the surface area of the first surface 212.

Figure 7:
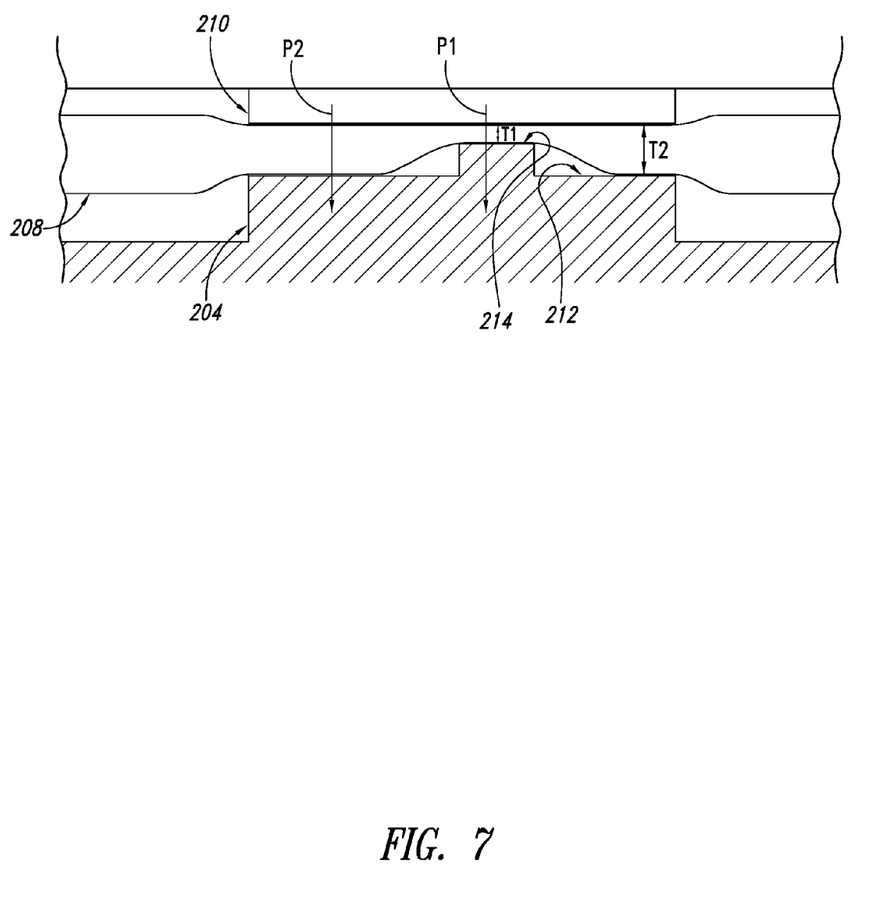
FIG. 7 is an enlarged, cross-sectional, side view of the disk drive of FIG. 2, illustrating the interposed layer of material compressed between a platform and the printed circuit board, according to one illustrated embodiment.

FIG. 7 is an enlarged, cross-sectional view of the disk drive 200 in FIG. 4, illustrating how the interposed layer of material 208 may be compressed between the platform 204 and the PCB 206. In one embodiment, the layer of material 208 is compressed between the second surface 214 of the platform 204 and the integrated circuit 210. The layer of material 208 may be compressed between the first surface 212 of the platform 204 and the integrated circuit 210 as well. However, the layer of material 208 may be more compressed proximate the second surface 214 than proximate the first surface 212. In one embodiment, the layer of material 208 may be compressed to a first thickness T1 at a first location between the second surface 214 of the platform 204 and the integrated circuit 210, and the layer of material 208 may be compressed to a second thickness T2 at a second location between the first surface 212 of the platform 204 and the integrated circuit 210. The ratio of the first thickness T1 to the second thickness T2 may be less than or equal to 80%. In other embodiments, the ratio may be less than or equal to 50%. In some embodiments, as the layer of material 208 becomes more compressed, it is capable of conducting more heat, thus facilitating the cooling of the high temperature portion of the integrated circuit 210.

In one embodiment, a first conductive path P1 may exist between the integrated circuit 210 and the second surface 214 of the platform 204 through the layer of material 208. A second conductive path P2 may exist between the integrated circuit 210 and the first surface 212 of the platform 204 through the layer of material 208. In one embodiment, a ratio of a heat transfer coefficient of the first conductive path P1 to a heat transfer coefficient of the second conductive path P2 may be greater than or equal to 150%. In other embodiments, the ratio may be greater than or equal to 200%. Of course, in still other embodiments, the heat transfer coefficient may be improved to a greater or lesser extent.

Figure 8:
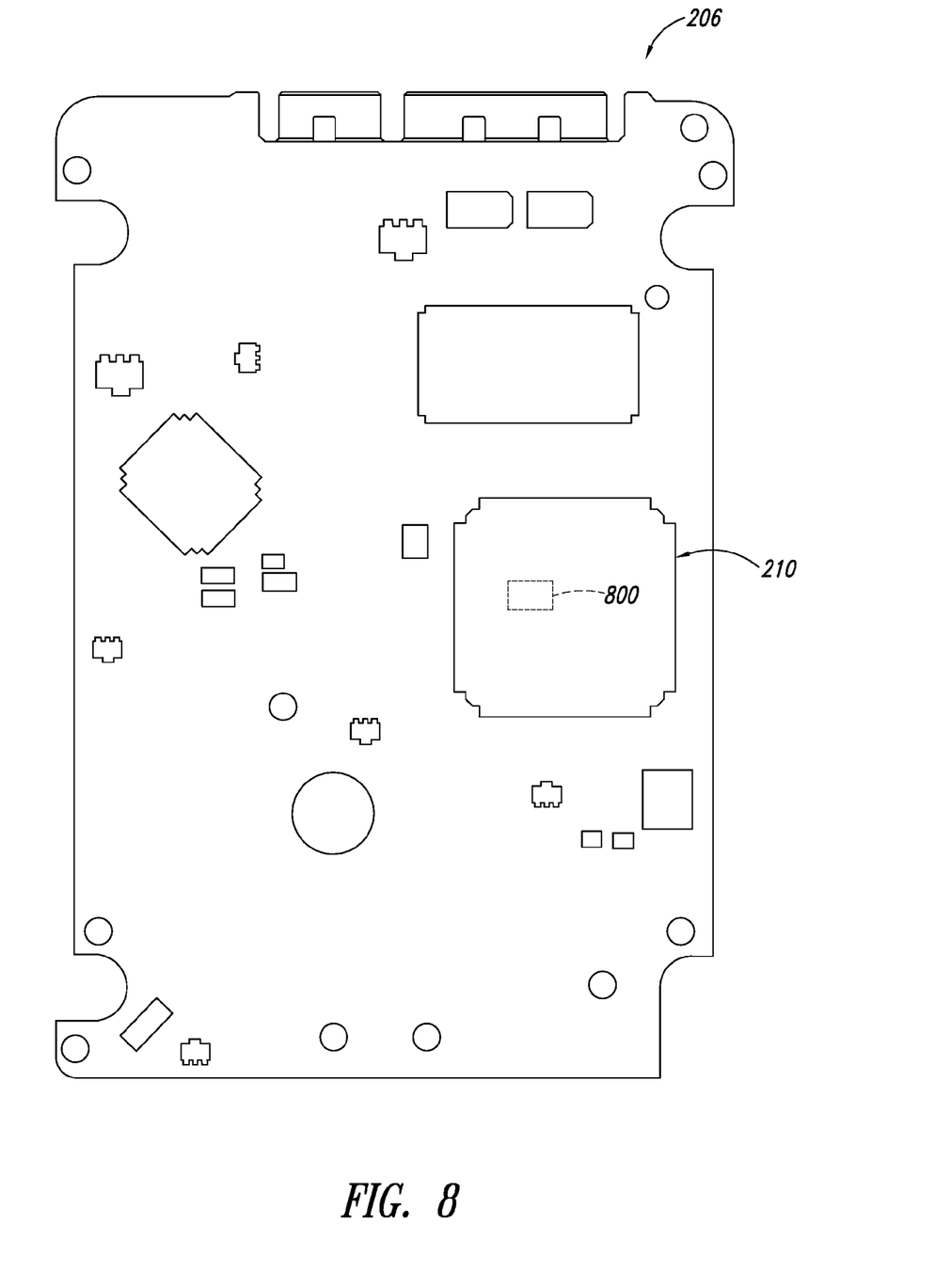
FIG. 8 is a top, schematic view of the printed circuit board of FIG. 2, according to one illustrated embodiment.

FIG. 8 is a top, schematic view of the PCB 206. A high temperature portion 800 of the integrated circuit 210 has been outlined for illustrative purposes. Of course, the high temperature portion 800 may not be designated by dashed lines or other visible features on the actual integrated circuit 210. In one embodiment, as described above, the high temperature portion 800 of the integrated circuit 210 may be generally aligned with the second surface 214 of the platform 204.

Figure 9:
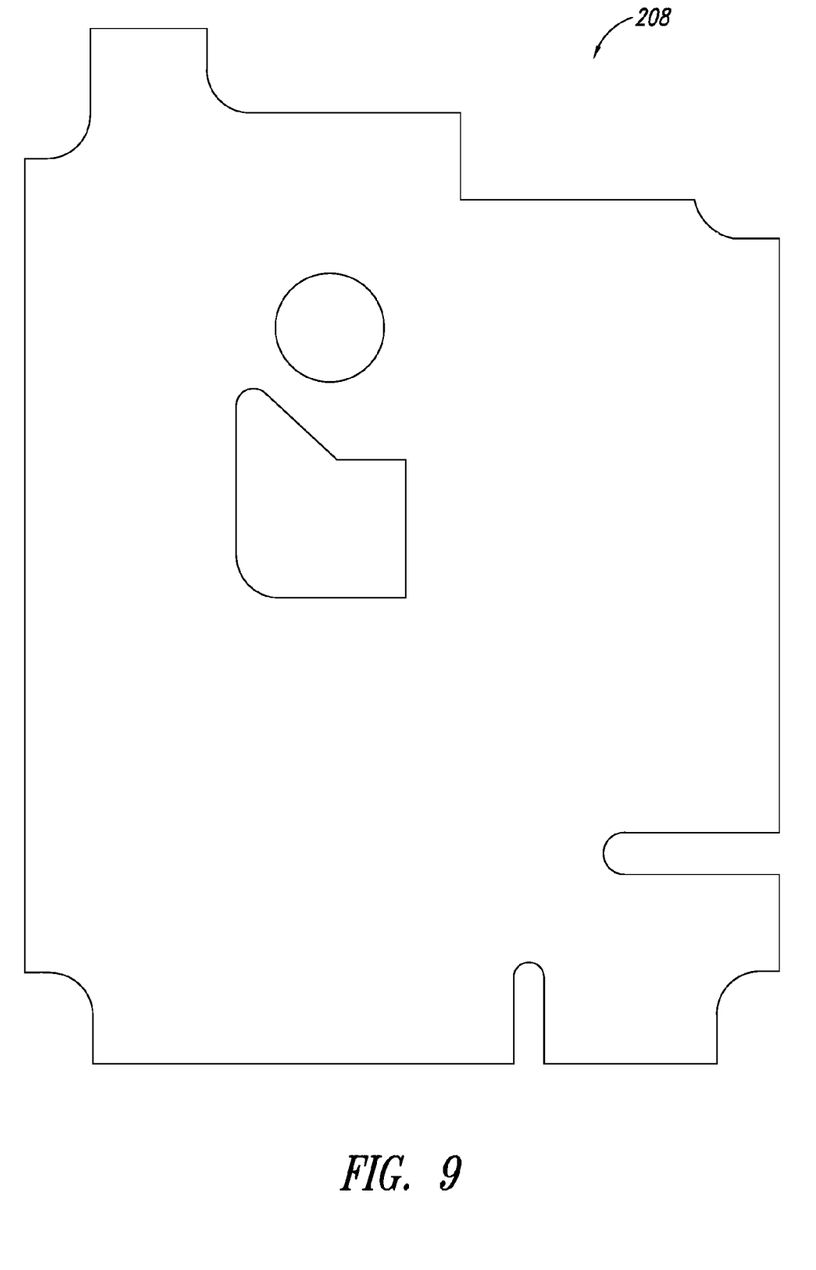
FIG. 9 is a top, schematic view of the interposed layer of material of FIG. 2, according to one illustrated embodiment.

FIG. 9 is a top, schematic view of the interposed layer of material 208, according to one illustrated embodiment. As shown in FIG. 9, the layer of material 208 may have an irregular outline with different cut-outs and different contours corresponding to portions of the disk drive base 202 and/or the PCB 206. In one embodiment, the layer of material 208 may be configured to cover substantially an entire surface area of the PCB 206.

Figure 10:
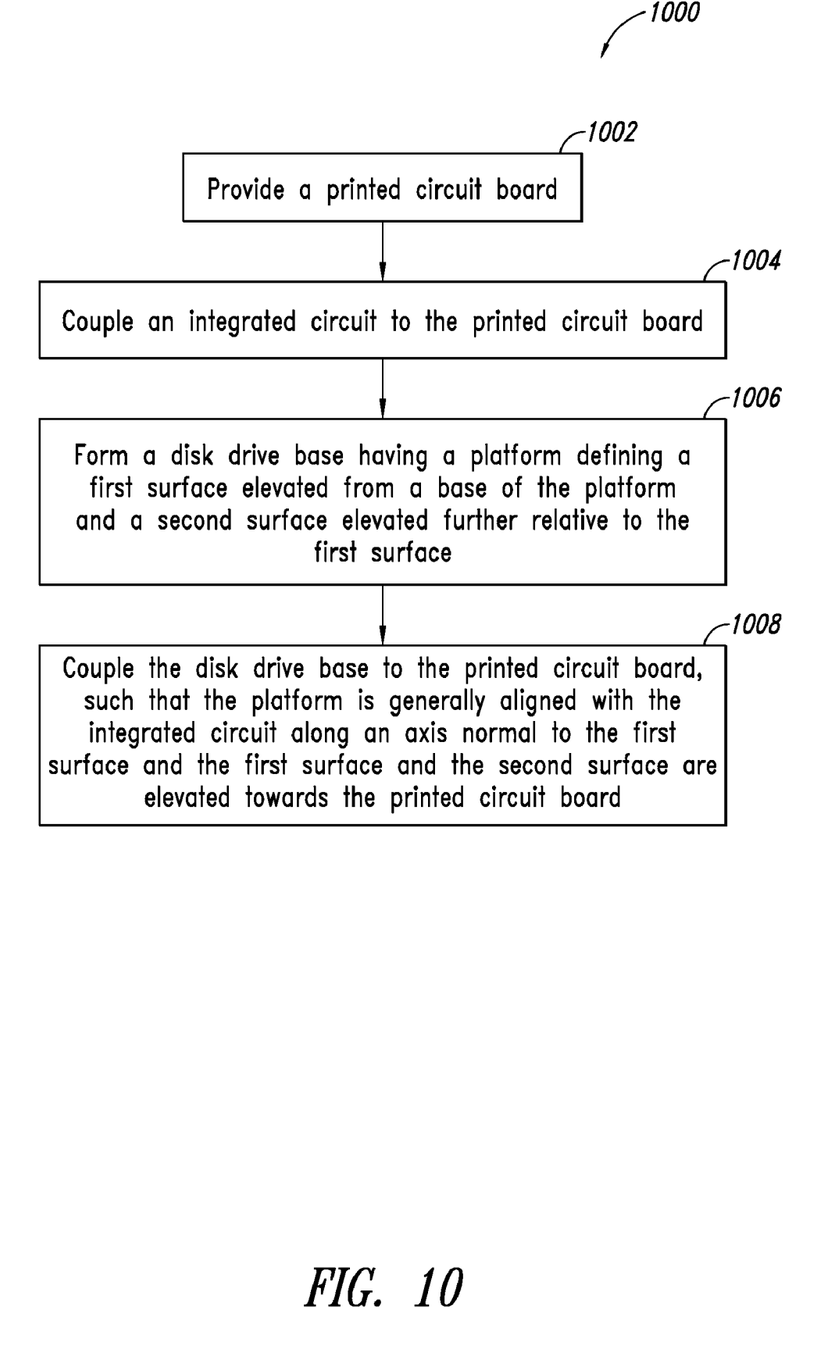
FIG. 10 illustrates a flow chart for a method of manufacturing a disk drive, according to one illustrated embodiment.

FIG. 10 illustrates a flow chart for a method 1000 of manufacturing a disk drive, according to one illustrated embodiment. This method 1000 will be discussed in the context of the disk drive 200 of FIGS. 2-9. However, the acts disclosed herein may be executed in the manufacture of a variety of disk drives, in accordance with the described method.

As described herein, all of the acts comprising the method 1000 may be orchestrated by a processor according to an automatic manufacturing process, based at least in part on computer-readable instructions stored in computer-readable memory. In another embodiment, a manual implementation of the method 1000 may also be employed. The acts need not necessarily occur in the order shown.

At act 1002, a printed circuit board 206 is provided. The PCB 206 may be provided in any of a variety of ways. In one embodiment, the PCB 206 may be provided at a manufacturing station, at which other acts may be carried out in accordance with the method 1000.

At act 1004, an integrated circuit 210 is coupled to the printed circuit board 206. In some embodiments, act 1002 and 1004 may be performed in this sequence. However, in other embodiments, the integrated circuit 210 may be first coupled to the PCB 206 at an earlier stage in manufacturing, and then the combination of the PCB 206 and the integrated circuit 210 may be provided.

The integrated circuit 210, as described above, may comprise any of a variety of integrated circuits, including SoC's, individually packaged disk drive subsystem circuitry, power driver circuitry, memory chips, etc. The integrated circuit 210 may also be coupled to the PCB 206 by any of a number of suitable techniques. In one embodiment, one or more leads of the integrated circuit 210 are soldered to the PCB 206. In other embodiments, the integrated circuit 210 may be formed integrally with the PCB 206.

At act 1006, a disk drive base 202 is formed, the disk drive base 202 having a platform 204 defining a first surface 212 elevated from a base of the platform 204 and a second surface 214 elevated further relative to the first surface 212.

The disk drive base 202 may be formed by any of a variety of techniques, including casting or machining. The platform 204 may also be defined on the disk drive base 202 in a variety of ways. In one embodiment, the platform 204 and the disk drive base 202 are monolithic. For example, the platform 204 may be formed during a casting operation of the disk drive base 202. As another example, the platform 204 may be formed by a machining operation performed on the disk drive base 202. In other embodiments, the platform 204 and the disk drive base 202 may be separate components that are coupled together.

At act 1008, the disk drive base 202 is coupled to the printed circuit board 206, such that the platform 204 is generally aligned with the integrated circuit 210 along an axis normal to the first surface 212, and the first surface 212 and the second surface 214 are elevated towards the printed circuit board 206. This particular configuration is discussed above in detail.

In one embodiment, the method 1000 may further comprise interposing a layer of material 208 between the PCB 206 and the platform 204. Moreover, this act of interposing the layer of material 208 may further comprise compressing the layer of material 208 between the PCB 206 and the platform 204. In one embodiment, this act may be performed by tightening screws that bring the PCB 206 and the disk drive base 202 closer together while compressing the layer of material 208 therebetween.

In one embodiment, the method 1000 may further comprise identifying a portion of the integrated circuit 210 that has a high operational temperature relative to other portions of the integrated circuit 210. When coupling the disk drive base 202 to the PCB 206, the disk drive base 202 may then be coupled to the PCB 206 such that the second surface 214 of the platform 204 is generally aligned with the identified portion of the integrated circuit 210 along an axis normal to the second surface 214.

Identification of the high temperature portion of the integrated circuit 210 may be performed in a number of ways. In one embodiment, tests may be performed on the integrated circuit 210 in order to empirically measure the heat generated in various portions of the integrated circuit 210 during operation. In another embodiment, the integrated circuit 210 may be simulated in order to determine which portions of the integrated circuit 210 may have relatively high operational temperatures.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

I claim:

1. A disk drive comprising:
a printed circuit board;
an integrated circuit coupled to the printed circuit board;
a disk drive base coupled to the printed circuit board; and
a platform, the platform including:
a platform base positioned on the disk drive base;
a first surface substantially parallel to the platform base and elevated from the platform base towards the printed circuit board; and
a second surface substantially parallel to the first surface and elevated from the first surface towards the printed circuit board;
wherein the platform is generally aligned with the integrated circuit along an axis normal to the first surface; and
wherein the disk drive further comprises:
a layer of material interposed between the printed circuit board and the platform such that the layer of material covers at least a portion of the first surface and at least a portion of the second surface.

2. The disk drive of claim 1, wherein the layer of material is compressible.

3. The disk drive of claim 2, wherein the layer of material is compressed between the second surface of the platform and the integrated circuit.

4. The disk drive of claim 3, wherein the layer of material is compressed to a first thickness at a first location between the second surface of the platform and the integrated circuit, and the layer of material is compressed to a second thickness at a second location between the first surface of the platform and the integrated circuit, a ratio of the first thickness to the second thickness being less than or equal to 80%.

5. The disk drive of claim 2, wherein the layer of material comprises an acoustic gasket material.

6. The disk drive of claim 2, wherein a height of the second surface above the first surface of the platform is between 1% and 25% of a thickness of the layer of material in an uncompressed state.

7. The disk drive of claim 1, further comprising:
a first conductive path between the integrated circuit and the second surface of the platform through the layer of material; and
a second conductive path between the integrated circuit and the first surface of the platform through the layer of material, wherein a ratio of a heat transfer coefficient of the first conductive path to a heat transfer coefficient of the second conductive path is greater than or equal to 150%.

8. The disk drive of claim 1, wherein the layer of material covers substantially an entire surface area of the printed circuit board.

9. The disk drive of claim 1, wherein the layer of material covers substantially an entire surface area of the second surface of the platform.

10. The disk drive of claim 1, wherein the first surface of the platform has a shape generally corresponding to a shape of the integrated circuit facing the first surface of the platform.

11. The disk drive of claim 1, wherein the second surface of the platform is generally aligned, along an axis normal to the second surface, with a portion of the integrated circuit that has a high operational temperature relative to other portions of the integrated circuit.

12. The disk drive of claim 1, wherein the disk drive base comprises aluminum.

13. The disk drive of claim 1, wherein the platform and the disk drive base are monolithic.

14. A method of manufacturing a disk drive comprising:
providing a printed circuit board having an integrated circuit coupled to the printed circuit board;
providing a disk drive base having a platform, the platform including:
a platform base positioned on the disk drive base;
a first surface substantially parallel to the platform base and elevated from the platform base; and
a second surface substantially parallel to the first surface and elevated from the first surface; and
interposing a layer of material between the printed circuit board and the platform such that the layer of material covers at least a portion of the first surface and at least a portion of the second surface;
wherein the method further comprises coupling the disk drive base to the printed circuit board such that the platform is generally aligned with the integrated circuit along an axis normal to the first surface and the first surface and the second surface are elevated towards the printed circuit board.

15. The method of claim 14, wherein interposing the layer of material further comprises compressing the layer of material between the printed circuit board and the platform.

16. The method of claim 14, further comprising:
identifying a portion of the integrated circuit that has a high operational temperature relative to other portions of the integrated circuit; and
wherein coupling the disk drive base to the printed circuit board includes coupling the disk drive base to the printed circuit board such that the second surface of the platform is generally aligned with the identified portion of the integrated circuit along an axis normal to the second surface.

* * * * *